No. 883,104. PATENTED MAR. 24, 1908.
E. L. FLOWERS.
FIRE ESCAPE.
APPLICATION FILED JULY 16, 1907.

Witnesses
G. R. Thomas
John S. Powers

Inventor
Edgar L. Flowers
By  
Attorneys

THE NORRIS PETERS CO., WASHINGTON, D. C.

UNITED STATES PATENT OFFICE.

EDGAR L. FLOWERS, OF HICKORY, NORTH CAROLINA.

FIRE-ESCAPE.

No. 883,104.   Specification of Letters Patent.   Patented March 24, 1908.

Application filed July 16, 1907. Serial No. 384,080.

*To all whom it may concern:*

Be it known that I, EDGAR L. FLOWERS, a citizen of the United States, residing at Hickory, in the county of Catawba, State of North Carolina, have invented certain new and useful Improvements in Fire-Escapes; and I do hereby declare the following to be a full, clear, and exact description of the invention, such as will enable others skilled in the art to which it appertains to make and use the same.

This invention relates to fire escapes and has for its object to provide an improved structure as set forth in the appended claim.

Figure 1:
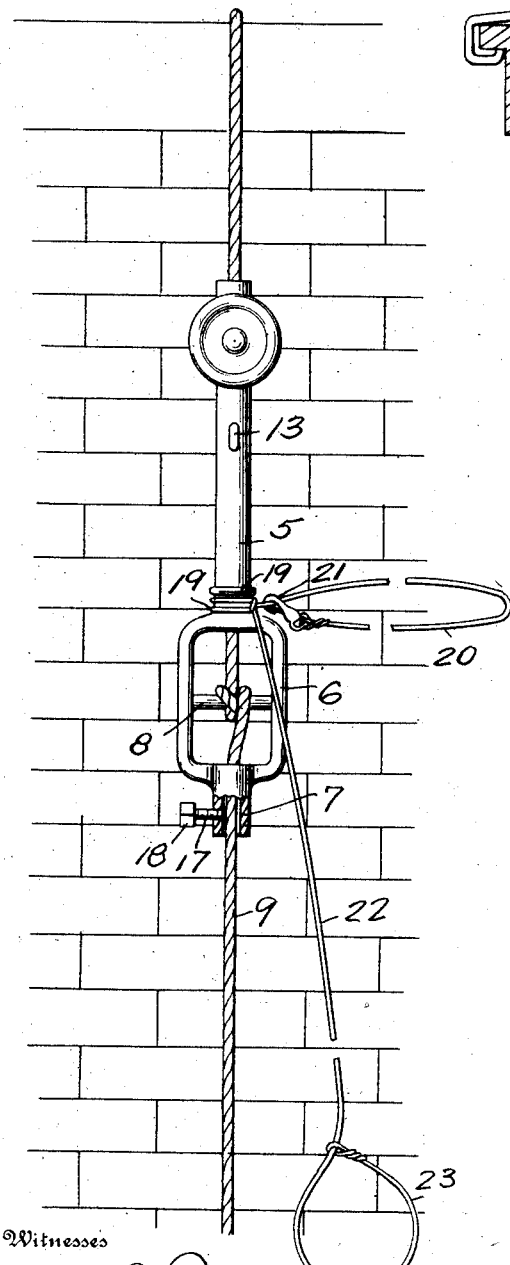
Figure 2:
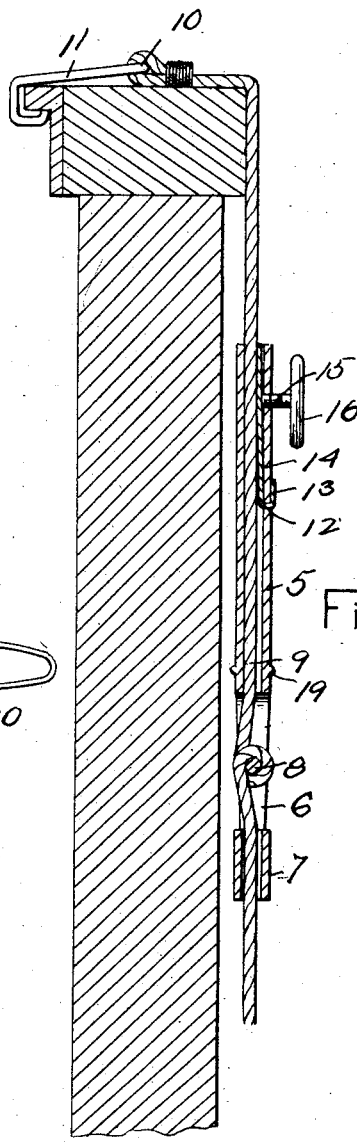

The details of construction will appear in the course of the following description in which reference is had to the accompanying drawings forming a part of this specification like characters of reference designating similar parts throughout the several views, wherein:

Figure 1 is a side elevation showing the manner of use of a fire escape, constructed in accordance with the present invention. Fig. 2 is a central longitudinal section thereof.

The present fire escape comprises an upper tubular member 5 and a lower tubular member 7 in axial alinement and which are connected by an integral open frame 6 having a width greater than the external diameter of either member for a purpose to be hereinafter explained. Connecting the sides of the frame 6 is a cross-bar 8. A rope 9 is passed through the tubular members 5 and 7 and around the cross-bar 8 so that when weight is hung upon the structure, it will slide down the rope. The upper end of the rope is connected with a hook 11 as shown at 10. The member 5 is formed in its body portion with an opening 12, through which is engaged the reduced angular end 13 of a spring brake shoe 14, the latter being designed to frictionally engage the guide rope 9. The shoe 14 has its end 13 passed through the opening 12 and bent upon the outer face of the member 5. Thus positive means are provided for fixing the leaf spring in the member 5 as well as a fixed point for which the said leaf spring exerts its force. Such engagement is effected by means of a screw 15 threaded through the member 5 and bearing against the shoe 14, the screw 15 being provided on its outer end with a handle 16 by means of which said screw may be manipulated.

For the purpose of holding the member 5 against displacement when not in use, a screw 17 is threaded through the lower tubular member 7 for frictional engagement with the rope 9, the screw 17 having a squared head 18 to permit of its ready manipulation. The rope 9 is coiled about the cross bar 8, so as to counterbalance by friction the gravity of the suspended body in order that the descent may be made at a regulatable and uniform rate of speed. For example, the speed is regulated for persons weighing up to 125 pounds by coiling the rope twice about the bar 8, for persons weighing up to 175 pounds by coiling the rope three times about the bar 8 and for persons weighing more than 175 pounds, four times about the bar 8.

The upper tubular member 5 is provided with a circumscribing flange 19 spaced slightly above the frame 6 and between the flange and frame is received a weight-carrying rope 22 which between its ends is looped around this portion of the member 5, at a point nearer to one end of the rope 22 than the other. The extremity of the shorter end portion of the rope 22 is provided with a snap hook 21 which is utilized in forming a noose 20 which in practice is disposed around the body of the operator beneath the arms. The opposite extremity of the rope 22 is provided with an eye which is utilized in the formation of a second noose 23 which noose has a stirrup to receive a foot of the operator.

The manner of use will be readily apparent from the foregoing description. The guide rope 9 is passed through the member 5 and the lower member 7 in the manner above described, the screw 17 is loosened, and the device is suspended from any desired part of the building by the hook 11. The person about to make the descent inserts his foot into the slip knot 21 and draws said knot tight, at the same time grasping the member 5 with his hands and suspending his whole weight from this member, the latter sliding downwardly along the rope 9 as a guide. The brake shoe 14 is employed in case the frictional resistance upon the bar 8 of the rope 9 is not sufficiently great.

It will be observed that the body 5, the frame 6 and the sleeve 7 are in substantially the same vertical plane and that when the screw 15 is removed, there are no substantial projections beyond the plane of the frame 6, the latter having its side bars approximately equal in width to the thickness of the body 5 and the sleeve 7. Hence, the structure is exceedingly compact and will take up a very small space so that a number of the devices may be readily packed in a small space for shipment, the screws 15 being packed separately if desired.

What is claimed is:

A fire escape comprising alined upper and lower tubular members and a connecting open frame having a width greater than the external diameter of the upper tubular member, a cross-bar connecting the sides of the frame, a rope passed through the tubular members and around the cross-bar, a brake carried by the upper tubular member in position to impinge upon the rope, a circumscribing flange upon the upper tubular member spaced from the frame, and a weight-carrying rope looped between its ends about the upper tubular member between the frame and flange and having a slip noose at each end.

In testimony whereof, I affix my signature, in presence of two witnesses.

EDGAR L. FLOWERS.

Witnesses:
  C. A. MOSER,
  C. T. MORRISON.